United States Patent [19]

Hsu

[11] Patent Number: 4,464,407
[45] Date of Patent: Aug. 7, 1984

[54] FLAVORING COMPOSITIONS

[75] Inventor: Jau Y. Hsu, Brookfield, Conn.

[73] Assignee: Societe D'Assistance Technique Pour Produits Nestle S.A., Lausanne, Switzerland

[21] Appl. No.: 549,654

[22] Filed: Nov. 8, 1983

Related U.S. Application Data

[63] Continuation of Ser. No. 353,393, Mar. 1, 1982, abandoned.

[51] Int. Cl.$^3$ ............................................. A23L 1/22
[52] U.S. Cl. ................................... 426/533; 426/650; 426/49; 426/51; 426/615
[58] Field of Search ..................... 426/51, 533, 46, 49, 426/52, 650, 615

[56] References Cited

U.S. PATENT DOCUMENTS

| | | | |
|---|---|---|---|
| 1,417,412 | 5/1922 | Richard | 426/51 |
| 2,318,810 | 5/1943 | Souther | 426/51 |
| 3,532,514 | 10/1970 | May | 426/533 |
| 3,716,580 | 2/1973 | de la Potterie | 426/264 |
| 3,741,775 | 6/1973 | Lee | 426/533 |
| 4,194,017 | 3/1980 | Poiger et al. | 426/533 |

OTHER PUBLICATIONS

Desrosier, Elements of Food Technology, 1977, Avi: Westport, Conn., p. 251.
Von Loesecke, Drying and Dehydration of Foods, 1943, Reinhold Publ. Corp.: N.Y., pp. 83, 104, 105, 107, 113, 117–119.
Cassell's Dictionary of Cookery, 1881, Cassel, Pelter, Galpin & Co.: London, pp. 832–833.
Cruess, Commercial Fruit and Vegetable Products, 2nd Ed., 1938, McGraw Hill Book Co., Inc.: New York, pp. 26–27, 538–541, 567–573.

*Primary Examiner*—Joseph Golian
*Attorney, Agent, or Firm*—Vogt & O'Donnell

[57] ABSTRACT

A flavoring composition comprising a mixture prepared
(a) from 10 to 80% by weight of a fermented vegetable juice and from 20 to 90% by weight of a hydrolyzed protein based on the weight of the mixture or
(b) from 2 to 80% by weight of a dehydrated fermented vegetable and from 20 to 98% by weight of a hydrolyzed protein based on the weight of the mixture. Flavoring agents with appetizing sour notes and with meat and vegetable flavor characteristics are described.

9 Claims, No Drawings

FLAVORING COMPOSITIONS

This is a continuation of application Ser. No. 353,393, filed Mar. 1, 1982, now abandoned.

The present invention relates to flavouring compositions more particularly to mixtures containing fermented vegetables and hydrolysed proteins.

Hydrolysed proteins which are used as flavouring agents may be either chemically hydrolysed or enzymatically hydrolysed. Chemically hydrolysed proteins do not have the fermented flavour characteristic of enzymatically hydrolysed proteins because, unlike the latter, they do not contain alcohols, sugars, lactic acid and acetic acid. In order to impart an appetizing sour note to hydrolysed plant protein, acidulants such as lactic acid, acetic acid or citric acid are commonly used. We have found, surprisingly, that by mixing fermented vegetables (solid or juice) with chemically or enzymatically hydrolysed proteins an appetizing sour note and a meat and vegetable flavour is imparted thereto, this flavour enhancing and modification effect being stronger and different from that imparted by the regular acidulants. Moreover, the admixture of fermented vegetables with chemically hydrolysed proteins creates fermented flavours similar to those of enzymatically hydrolysed proteins.

Accordingly, the present invention provides a flavouring composition comprising a mixture prepared (a) from 10 to 80% by weight of a fermented vegetable juice and from 20 to 90% by weight of a hydrolysed protein based on the weight of the mixture or (b) from 2 to 80% by weight of a dehydrated fermented vegetable and from 20 to 98% by weight of a hydrolysed protein based on the weight of the mixture.

In the flavouring compositions formed from either of the mixtures (a) and (b) the hydrolysed protein may be in either liquid or powder form.

The fermented vegetable may be any vegetable preserved by lactic acid fermentation for example, fermented vegetables prepared from cabbage, cucumber, green tomato, red pepper, mustard stem, mustard green, radish, turnip or squash.

The hydrolysed protein may be of plant or animal origin and may be a chemically or enzymatically hydrolysed protein. For example, the hydrolysed protein may be a chemical hydrolysate prepared from a plant or animal source, an autolysed yeast extract from brewer's or baker's yeast, soy sauce from enzymatically degraded soy or soy and wheat mixtures, and meat flavours based on hydrolysed proteins reacting with other ingredients such as reducing sugars, thiamine or cysteine.

In one example of a fermented flavour prepared from a mixture of type (a), the flavouring composition may be a hydrolysed protein liquid seasoning which comprises a mixture of fermented vegetable juice and chemically hydrolysed protein which is preferably in the form of a powder or paste. The mixture preferably contains from 15 to 75% and especially from 20 to 70% by weight of fermented vegetable juice, the remainder being hydrolyzed protein. Optionally, other ingredients such as salt and water may be added depending on the desired fermented flavour intensity and saltiness. If desired the fermented vegetable juice may be concentrated or concentrated and dried before mixing with the chemically hydrolysed protein. Alternatively, the fermented vegetable juice and chemically hydrolysed protein may be dried, conveniently by spray-drying whereby only a small amount of the volatile acids are lost, advantageously at a temperature of from 85° C. to 95° C., and used as a powdered flavouring agent.

In another example of a fermented flavour prepared from a mixture of type (a), the flavouring composition may be a liquid seasoning with a fermented soy sauce flavour characteristic which comprises a mixture of fermented vegetable juice and a reaction liquid formed by heating glucose and water with a chemically hydrolysed protein containing chemically hydrolysed soy protein in an amount generally from 25 to 75% by weight of the total hydrolysed protein. The amount of fermented vegetable juice in the mixture is conveniently from 15 to 60% and especially from 20 to 50% by weight based on the weight of the composition, the remainder being the chemically hydrolysed protein/glucose reaction liquid. Examples of fermented vegetable juices which may be used are sauerkraut and fermented cucumber juices.

In a flavour prepared from a mixture of type (b) having meat, vegetable or cooked acid properties, the flavouring composition is preferably a powder which comprises a mixture of a powdered dehydrated fermented vegetable and either a powdered hydrolysed protein or a powdered meat flavour based on hydrolysed protein. The protein may be chemically or enzymatically hydrolysed.

The fermented vegetables used may be fermented mustard stem, mustard green, cabbage, radish or pickled cucumber. The fermented vegetables are conveniently dehydrated by vacuum drying, drum drying or hot air drying. Vacuum drying may be conducted in shelf dryers. The fermented vegetables may be in normal or frozen condition and the drying temperature may be from 70° C. to 90° C. under a vacuum of for example, from 25 mm to 30 mm Hg. In hot air or drum drying, the drying temperature is preferably from 120° C. to 150° C. Hot air drying can be carried out in a tray or a fluidised bed. Drum drying can be carried out under atmospheric or vacuum conditions. The drying time depends on the moisture content which, after drying, is preferably below 10% by weight and especially below 5% by weight. Vacuum drying is preferred because of the lower drying temperatures used which minimise the loss of volatile acids. After drying, the vegetables may then be ground into the powder which is preferably fine.

The hydrolysed protein may be a chemically hydrolysed protein from plant or animal sources, autolysed yeast extracts from brewer's or baker's yeast and soy sauce from enzymatically degraded soy or soy and wheat mixtures. The protein may be dried in a similar manner to the fermented vegetables.

The fermented vegetables and the hydrolysed proteins are preferably dried separately and then mixed together to form a meat/vegetable stock flavour ingredient. The amount of dehydrated fermented vegetable present is conveniently from 5 to 65% and preferably from 10 to 60% by weight based on the weight of the mixture, the remainder being the hydrolysed protein. This flavour mixture may be rehydrated with hot water to give an instant broth.

If desired, however, the fermented vegetables and hydrolysed proteins may be dried together to produce a cooked vegetable flavour. The amount of dehydrated fermented vegetable present in such a flavour may be from 5 to 65% and preferably from 10 to 60% by weight based on the weight of the mixture, the remainder being the hydrolysed protein. This flavour mixture may be rehydrated with hot water to give a cooked acid/vegetable flavour that can be used in instant dishes.

The present invention also provides a powdered dehydrated fermented vegetable which may be used as a flavouring agent.

The following Examples further illustrate the present invention. Parts are expressed by weight.

EXAMPLE 1

38 parts of powdered chemical hydrolysate were mixed with 62 parts sauerkraut juice and the mixture was spray-dried in a Niro spray dryer (inlet temperature: 88°–93° C., outlet temperature: 32°–35° C.). The spray dried powder had a natural fermented flavour characteristic and the acid taste was also stronger than that of chemical hydrolysate because of the incorporation of lactic acid from juice to hydrolysate as indicated by the following analytical results (5% solution):

|  | Acidity | pH |
| --- | --- | --- |
| Chemical Hydrolysate Powder | 5.94% | 5.2 |
| Spray Dried Powder of Chemical Hydrolysate and Sauerkraut Juice | 7.92% | 4.2 |

EXAMPLE 2

10 parts of powdered soy chemical hydrolysate, 10 parts of powdered wheat chemical hydrolysate, 3 parts of glucose and 4.6 parts of salt were heated with 28 parts of water at 80°–85° C. for one hour. To this mixture were added 5 further parts of powdered soy chemical hydrolysate, 5 further parts of powdered wheat chemical hydrolysate and 34.4 parts sauerkraut juice. The resultant liquid had a fermented flavour characteristic similar to that of fermented soy sauce.

EXAMPLE 3

Liquid protein hydrolysate seasoning was concentrated and vacuum dried into powder form and 40 parts of this dehydrated bottle seasoning was added to 60 parts of sauerkraut juice. Compared with regular bottle seasoning, the powdered seasoning rehydrated with sauerkraut juice had a refreshing flavour characteristic.

EXAMPLE 4

Fermented mustard stem was dehydrated into dry form under vacuum at 80° C. for 3 hours until the moisture content was below 5%, and then ground into fine powder form. 50 parts of this powder was added to 50 parts of powdered soy sauce to give the flavouring mixture. When this mixture was rehydrated with hot water, an instant broth was formed which had a typical flavour characteristic of Oriental fermented vegetable/meat broth.

EXAMPLE 5

70 parts of sauerkraut (solids and juice) was ground into a fine paste and mixed with 30 parts of hydrolysed protein paste. This mixture was dehydrated under vacuum at 80° C. for 4 hours to give a dry form having a moisture content below 5% and then ground to a fine powder. When this mixture was rehydrated with hot water a cooked acid/vegetable flavour was produced which could be used in instant food dishes.

EXAMPLE 6

Sauerkraut was dehydrated under vacuum at 80° C. to a moisture content below 5% 0.2 g of the dehydrated sauerkraut (containing 12% lactic acid) was added to 1.0 g hydrolysed plant protein in 170 ml of hot water. The mixture had a strong appetizing vegetable note.

In comparison, when a similar process was carried out but using 0.2 g lactic acid powder (containing 22% lactic acid) instead of the dehydrated sauerkraut, the flavour was weaker and not very different from hydrolysed plant protein. This indicates that the flavouring effect of dehydrated fermented vegetable is not contributed solely by its lactic acid content.

I claim:

1. A flavouring composition characterised in that it comprises a mixture prepared
   (a) from 10 to 80% by weight of a lactic acid fermented vegetable juice and from 20 to 90% by weight of a hydrolysed protein based on the weight of the mixture or
   (b) from 2 to 80% by weight of a dehydrated lactic acid fermented vegetable and from 20 to 98% by weight of a hydrolysed protein based on the weight of the mixture, wherein in the combination of (a) or (b) the fermented vegetable material imparts an appetizing sour note and a meat and vegetable flavor.

2. A flavouring composition of type (a) according to claim 1 characterised in that it comprises a mixture containing from 20 to 70% by weight of fermented vegetable juice and from 30 to 80% by weight of chemically hydrolysed protein powder or paste based on the weight of the mixture.

3. A flavouring composition of type (a) according to claim 1 characterised in that the fermented vegetable juice and chemically hydrolysed protein are dehydrated by spray drying to give a powder.

4. A flavouring composition of type (a) according to claim 1 characterised in that it comprises a mixture of fermented vegetable juice and a reaction liquid formed by heating glucose and water with a chemically hydrolysed protein containing chemically hydrolysed soy protein in an amount from 25 to 75% by weight of the total hydrolysed protein.

5. A flavouring composition according to claim 4 characterised in that the mixture contains from 20 to 50% by weight of fermented vegetable juice and from 50 to 80% by weight of the reaction liquid based on the weight of the mixture.

6. A flavouring composition of type (b) according to claim 1 characterised in that it comprises a mixture of powdered dehydrated fermented vegetable and either a powdered hydrolysed protein or a powdered meat flavour based on hydrolysed protein, the protein being chemically or enzymatically hydrolysed.

7. A flavouring composition according to claim 6 characterised in that the fermented vegetables and hydrolysed proteins are dehydrated by vacuum drying.

8. A flavouring composition according to claim 6 or claim 7 characterised in that the fermented vegetables and the hydrolysed proteins are dried separately and then mixed to give a mixture containing from 5 to 65% by weight of dehydrated fermented vegetables and from 35 to 95% by weight of hydrolysed protein based on the weight of the mixture.

9. A flavouring composition according to claim 6 or claim 7 characterised in that the fermented vegetables and the hydrolysed proteins are dried together to give a solid mixture containing from 5 to 65% by weight of dehydrated fermented vegetables and from 35 to 95% by weight of hydrolysed proteins based on the weight of the mixture.

* * * * *